April 9, 1963        A. W. CARLSON        3,085,209

WIDE-BAND DIFFERENTIAL AMPLIFICATION

Filed April 5, 1956                             3 Sheets-Sheet 1

INVENTOR.
ARTHUR WILLIAM CARLSON
BY Wade Koontz
Sherman H. Goldman
ATTORNEYS

April 9, 1963 A. W. CARLSON 3,085,209
WIDE-BAND DIFFERENTIAL AMPLIFICATION
Filed April 5, 1956 3 Sheets-Sheet 2

INVENTOR.
ARTHUR WILLIAM CARLSON
BY Wade Koonty
and
Sherman H. Goldman
ATTORNEYS April 9, 1963  A. W. CARLSON  3,085,209
WIDE-BAND DIFFERENTIAL AMPLIFICATION
Filed April 5, 1956  3 Sheets-Sheet 3

INVENTOR.
ARTHUR WILLIAM CARLSON
BY Wade Koontz
and
Sherman H. Goldman
ATTORNEYS

United States Patent Office 3,085,209
Patented Apr. 9, 1963

3,085,209
WIDE-BAND DIFFERENTIAL AMPLIFICATION
Arthur William Carlson, Harrison, Maine
Filed Apr. 5, 1956, Ser. No. 576,504
2 Claims. (Cl. 330—74)
(Granted under Title 35, U.S. Code (1952), sec. 266)

This invention described herein may be manufactured and used by or for the United States Government for governmental purposes without payment to me of any royalty thereon.

This invention relates to amplifiers and more particularly to a differential amplifier having a single-ended output.

It is frequently desirable to observe voltage waveforms between two points above ground. The usual manner for taking these observations is by recording the waveforms between each of the points and ground and taking the difference to obtain the desired waveform or by utilizing the two probes of a differential oscilloscope.

An object of the invention is the provision of a differential amplifier which is useful in converting a single channel oscilloscope into a differential oscilloscope.

A further object of the invention is the provision of an amplifier with a differential output which is capable of adding or subtracting voltages in computing or servo systems.

Another object of this invention is the provision of a differential amplifier with wide bandwidth and low output impedance.

A still further object of the invention is the provision of a device which has a high degree of stability and accuracy.

An additional object is the provision of a novel method for adding and subtracting signals.

Another object of the invention is the provision of a device capable of utilizing standard, commercially available components which are both inexpensive and easy to assemble.

These and other advantages, features and objects of the invention will become more apparent from the following description taken in connection with the illustrative embodiments in the accompanying drawings, wherein.

Figure 1:
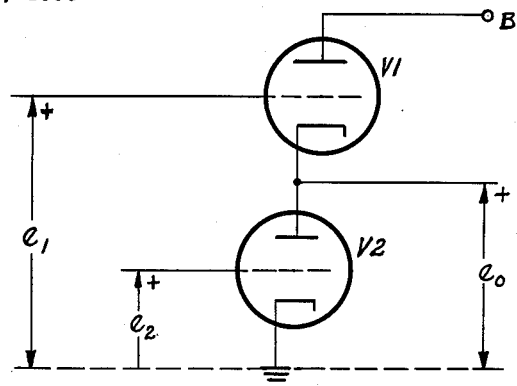
FIG. 1 shows the basic circuit involved in a practice of the invention.

As illustrated in FIG. 1, the invention may be embodied in circuitry comprising a pair of tubes, $V_1$ and $V_2$, arranged in series with signal voltages $e_1$ and $e_2$ applied to the grids of $V_1$ and $V_2$, respectively. The output of the circuit $e_0$, is taken at the junction of the plate of $V_2$ and cathode of $V_1$.

The gain of each tube in FIG. 1 is equal to that of a cathode follower, and with the tubes having the same transconductances ($g_m$) and operated as Class A the circuit is balanced. The gain, therefore, of each tube is the same except for sign.

Figure 3:
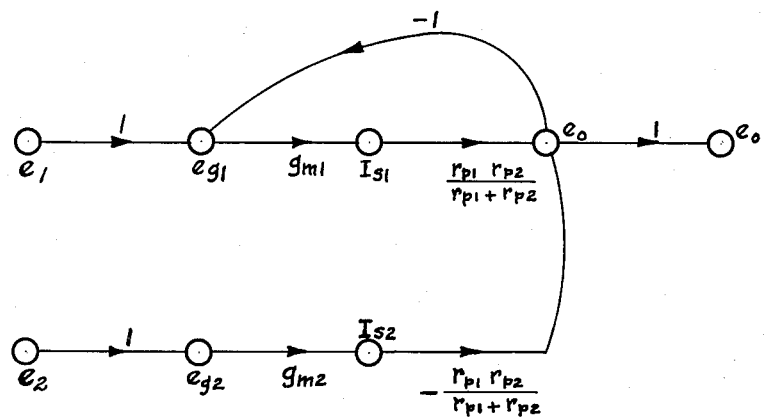
FIG. 3 is a flow-graph representation of the circuit of FIG. 2.
Figure 2:
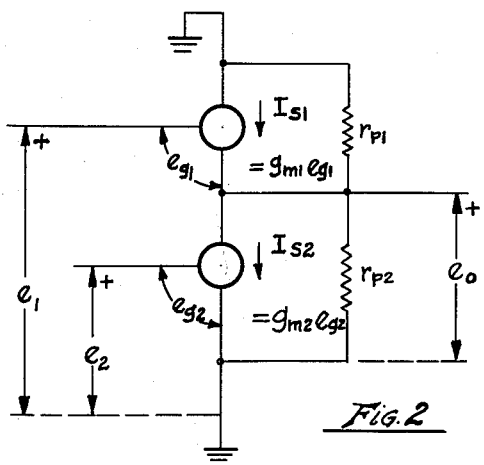
FIG. 2 illustrates a small signal equivalent circuit of that shown in FIG. 1.

By referring to the small signal equivalent circuit of FIG. 2 and the flow-graph of FIG. 3 it can be seen that plate resistances $r_{p1}$ and $r_{p2}$ are in parallel; therefore, the total resistance $$R = \frac{r_{p1} r_{p2}}{r_{p1} + r_{p2}}$$

The output voltage, as depicted in FIG. 3

$$e_0 = \frac{(g_{m1} e_1 - g_{m2} e_2) R}{1 + g_{m1} R}$$

It can be seen from this formula that all the feedback is contributed by $V_1$ and is common to both inputs. With the transconductance for both $V_1$ and $V_2$ being equal, $$e_0 = \frac{g_m R (e_1 - e_2)}{1 + g_m R}$$

which shows that the common mode ($e_1 = e_2$) is rejected. The gain of the circuit for the differential mode ($e_2 = -e_1$) would be that of a cathode follower with a cathode resistance of $r_p$. The circuit is also similar to that of a cathode follower as can be shown when $e_1$ and $e_2$ are equal to zero and a unit current is injected into the output terminal, then $$R_0 = \frac{e_0}{I} = \frac{R}{1 + g_{m1} R}$$

which is the output impedance for a cathode follower with a cathode resistance of $r_p$; however, when $g_{m1} R$ is much greater than 1, $$R_0 \approx \frac{1}{g_{m1}}$$

The basic circuit of FIG. 1 differs from a cathode follower in that there is no similar reduction in input capacity for $V_2$ or with $V_1$ except when a signal is not present at $V_2$.

Figure 4:
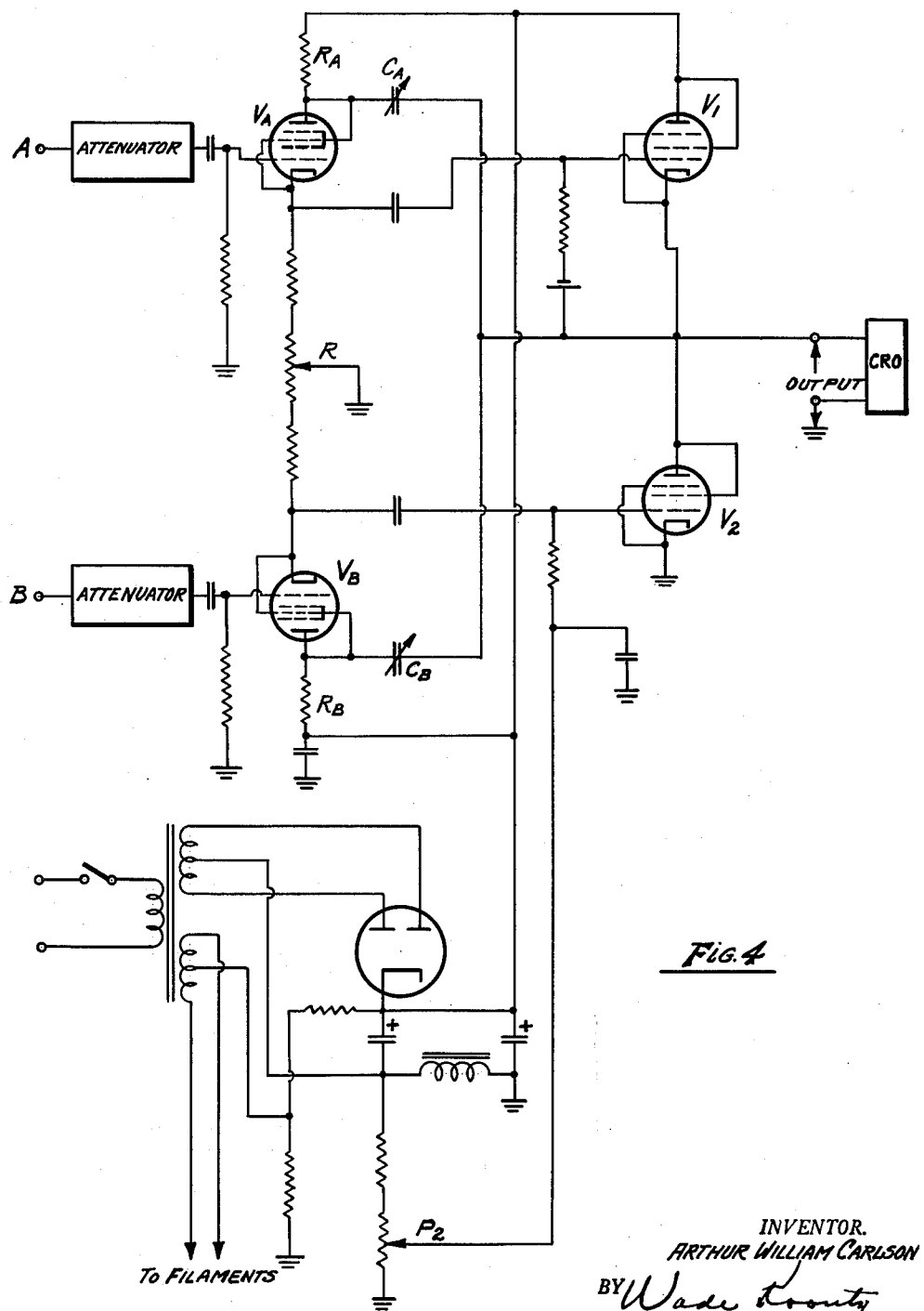
FIG. 4 depicts a wiring diagram of the wide-band differential amplifier of this invention.

Referring to FIG. 4, the wide-band differential amplifier circuit has an input at A and at B coupled to the control grids of a pair of cathode followers $V_A$ and $V_B$. The input circuits are shown by way of example as containing attenuators and capacitive coupling with the usual grid leak resistors. A potentiometer $P_1$, placed between the cathode resistors is used to balance the circuit. Capacitor coupling is provided from the cathodes of $V_A$ and $V_B$ to the control grids of $V_1$ and $V_2$, respectively. Load resistors $R_A$ and $R_B$ in the plate circuits of tubes $V_A$ and $V_B$, respectively, provide a signal out of phase with the signal developed at the cathode. Variable capacitor $C_A$ couples a signal which neutralizes the grid-to-cathode capacity of tube $V_1$ while variable capacitor $C_B$ neutralizes the grid-to-plate capacity of tube $V_2$. A power supply, shown below the circuit of tube $V_B$, provides the B+ voltage for the tubes and by means of potentiometer $P_2$ and the drop across the filter choke provides the grid bias for tube $V_2$. The bias for $V_1$ is obtained by means of a bias cell in order to minimize the capacity to ground. Adjustment of $P_2$, the bias control of $V_2$, assists in obtaining a balanced output over a wide frequency range by equalizing the cathode loads of $V_A$ and $V_B$. Conventional grid resistors are provided in series with the biasing voltages. Bypass capacitors are also used from the movable element of $P_2$ to ground and B+ to ground. When the above-described circuit is used to convert a single channel oscilloscope to a differential one, the oscilloscope is connected across the output of the circuit.

Figure 5:
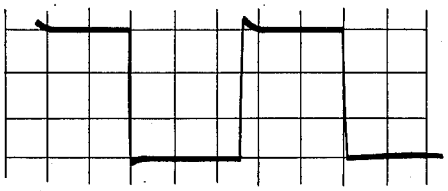
FIGS. 5 and 6 show waveforms demonstrating suppression of the common mode.
Figure 6:
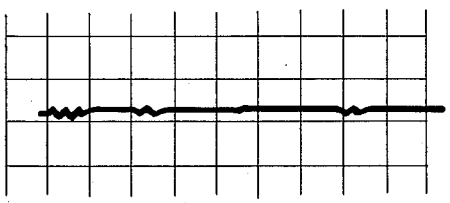
Figure 7:
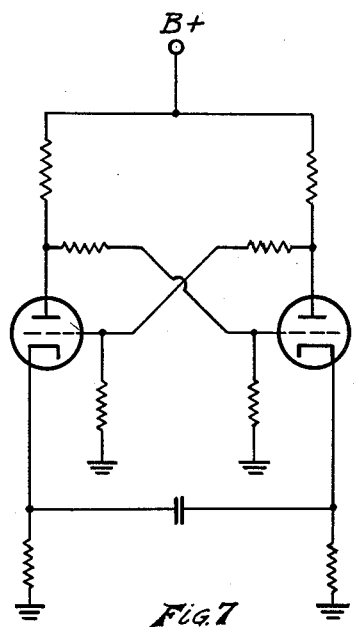
FIG. 7 is a presentation of a multivibrator in order to illustrate the use of the differential amplifier of FIG. 4.

FIGS. 5 and 6 show waveforms demonstrating the ability of the circuit of FIG. 4 to suppress the common mode. FIG. 5 shows the waveform of the output of the differential circuit with a square wave applied only to channel A, while FIG. 6 illustrates the waveform when the same square wave is also applied to channel B with the oscilloscope sensitivity increased by a factor of 10.

Figure 8:
FIGS. 8, 9 and 10 depict waveforms obtained from the circuit of FIG. 7.
Figure 9:
Figure 10:
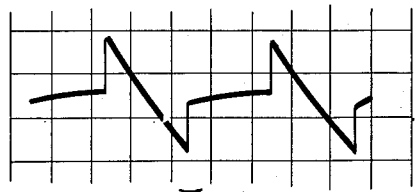

FIGS. 7 through 10 illustrate an example of the usefulness of the invention. The waveform of FIG. 8 is that of the voltage across the capacitor in the free-running multivibrator of FIG. 7. FIGS. 9 and 10 are the voltage waveforms between the end terminals of the same capacitor and ground; therefore, the differential amplifier has functioned to subtract the waveform of FIG. 9 from that of FIG. 10 to produce the waveform of FIG. 8.

Although the invention has been described with reference to a particular embodiment, it will be understood to those skilled in the art that the invention is capable of a variety of alternative embodiments. For example, when as oscilloscope with a restricted bandwidth of only a few megacycles is used, the output circuit of FIG. 4 could be reduced to a single double-triode. The bias cell of $V_1$ could be replaced by a Zener diode with a slight reduction in shunt capacity. The cathode followers used for driving the output circuit and the biasing arrangement for $V_1$ are a preferred arrangement since the impedance of the circuit driving the output stage becomes important when it approaches an appreciable fraction of the grid resistance but would not alter the balance of the circuit provided $V_1$ and $V_2$ are both driven from sources of the same impedance. Although A.C. coupling was shown for simplicity, it is obvious that D.C. coupling could be used.

It should be apparent to one skilled in the art that the device is equally capable of producing a pure addition function by creating a reversal of sign by any one of a number of well known means, for example, by means of a transformer, of the signal which is phase shifted 180° in the basic circuit.

I intend to be limited only by the spirit and scope of the appended claims.

I claim:

1. A method of adding one signal voltage to another for the purpose of supplying a sum signal to a single channel oscilloscope in computing and servomechanism operations comprising the steps of connecting two class A amplifier tubes of equal transconductance in series arrangement, the first said amplifier tube having its anode connected to a potential source and its cathode directly coupled to the anode of said second amplifier tube and said second amplifier tube having its cathode connected to ground, applying a first signal voltage to the grid of said first amplifier tube and a second signal voltage in phase with said first signal voltage to the grid of said second amplifier tube, and obtaining an output signal voltage between the anode of said second amplifier tube and ground which is responsive to the sum of said first and second signal voltages.

2. A method of obtaining a signal voltage representing the sum of two discrete signal voltages for use in computing and servomechanism systems comprising the steps of applying one discrete signal voltage to the grid of one of two amplifier tubes which are connected in series between a plate potential and ground, applying the other discrete signal voltage in phase with the first said signal voltage to the grid of the other said amplifier tube, and obtaining an output signal between the junction of said amplifier tubes and ground.

References Cited in the file of this patent

UNITED STATES PATENTS

| | | |
|---|---|---|
| 2,633,402 | Fleming | Mar. 31, 1953 |
| 2,633,528 | Hutson | Mar. 31, 1953 |
| 2,719,225 | Morris | Sept. 27, 1955 |
| 2,761,019 | Hall | Aug. 28, 1956 |
| 2,763,733 | Coulter | Sept. 18, 1956 |
| 2,773,136 | Futterman | Dec. 4, 1956 |
| 2,777,020 | Dobosy | Jan. 8, 1957 |
| 2,780,682 | Klein | Feb. 5, 1957 |